United States Patent
Jeong et al.

(10) Patent No.: US 9,282,502 B2
(45) Date of Patent: Mar. 8, 2016

(54) METHOD AND APPARATUS FOR CONTROLLING MEASURING FREQUENCY OF FORBIDDEN REGISTRATION AREA IN A MOBILE COMMUNICATION SYSTEM

(75) Inventors: Kyeong-In Jeong, Suwon-si (KR); Gert Jan Van Lieshout, Middlesex (GB); Himke Van Der Velde, Middlesex (GB); Soeng-Hun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 686 days.

(21) Appl. No.: 11/594,990

(22) Filed: Nov. 9, 2006

(65) Prior Publication Data

US 2007/0184834 A1 Aug. 9, 2007

(30) Foreign Application Priority Data

Nov. 10, 2005 (KR) .......................... 10-2005-107761
Nov. 15, 2005 (KR) .......................... 10-2005-109377

(51) Int. Cl.
*H04W 4/00* (2009.01)
*H04W 48/04* (2009.01)
(Continued)

(52) U.S. Cl.
CPC .......... *H04W 48/04* (2013.01); *H04W 36/0083* (2013.01); *H04W 36/32* (2013.01)

(58) Field of Classification Search
CPC ..... H04W 48/16; H04W 16/18; H04W 60/00; H04W 88/02; H04W 36/30; H04W 8/183; H04W 24/00; H04W 36/32; H04W 80/04
USPC ............. 455/449, 441, 434, 446, 435.1, 421, 455/455, 437, 432.1, 436, 452.1; 370/331
See application file for complete search history.

(56) References Cited

U.S. PATENT DOCUMENTS 5,701,586 A * 12/1997 Tabbane et al. ............ 455/422.1
6,208,861 B1 * 3/2001 Suzuki ........................ 455/441
(Continued)

FOREIGN PATENT DOCUMENTS

EP    1 286 561 A1    2/2003
EP    1 478 199 A1    11/2004
(Continued)

OTHER PUBLICATIONS

ETSI Standards, European Telecommunications Standards Institute: "Universal Mobile Telecommunications System (UMTS); User Equipment (UE) Procedures in Idle Mode and Procedures for Cell Reselection in Connected Mode", TS 125 304, vol. 3-R2, No. V5.9.0, Sep. 2005, pp. 1-46, XP014032573 (Sophia Antipolis, FR).
(Continued)

*Primary Examiner* — Charles Appiah
*Assistant Examiner* — Alexander Yi
(74) *Attorney, Agent, or Firm* — Jefferson IP Law, LLP

(57) ABSTRACT

A method and apparatus for controlling measuring the frequency of a new cell within a forbidden registration area when a User Equipment (UE) enters into the new cell in a mobile communication system are provided. If the UE recognizes the new registration area as forbidden, the UE does not measure the frequency of the current cell for a predetermined reference time, and searches for a suitable cell for a normal service by measuring other frequencies. If no suitable cell in the other frequencies is found, the UE removes a measuring limitation and searches for an acceptable cell for a limited service by measuring frequencies including frequency of the current cell.

18 Claims, 7 Drawing Sheets

(51) Int. Cl.
*H04W 36/00* (2009.01)
*H04W 36/32* (2009.01)

(56) References Cited

U.S. PATENT DOCUMENTS

| | | | |
|---|---|---|---|
| 2002/0172175 A1* | 11/2002 | Okamura | 370/338 |
| 2004/0043798 A1 | 3/2004 | Amerga et al. | 455/574 |
| 2004/0203839 A1* | 10/2004 | Ostberg et al. | 455/455 |
| 2005/0070274 A1* | 3/2005 | Pedlar et al. | 455/432.1 |
| 2005/0073977 A1 | 4/2005 | Vanghi et al. | 370/335 |
| 2005/0079870 A1 | 4/2005 | Rick et al. | |
| 2005/0288017 A1 | 12/2005 | Doumenc et al. | 455/435.3 |
| 2006/0084443 A1* | 4/2006 | Yeo et al. | 455/449 |
| 2006/0121914 A1 | 6/2006 | Kim et al. | 455/456.1 |
| 2008/0233959 A1 | 9/2008 | Klatt | |

FOREIGN PATENT DOCUMENTS

| | | |
|---|---|---|
| KR | 1019930011478 B1 | 12/1993 |
| KR | 1997-0056010 | 7/1997 |
| KR | 1020010048490 A | 6/2001 |
| KR | 1020010050200 A | 6/2001 |
| KR | 2001-0108309 | 12/2001 |
| WO | 2007/009433 A1 | 1/2007 |

OTHER PUBLICATIONS

"3GPP TS 25.304 V11.4.0, 3rd Generation Partnership Project; Technical Specification Group Radio Access Network; User Equipment (UE) Procedures in Idle Mode and Procedures for Cell Reselection in Connected Mode, (Release 11)", Sep. 2013, pp. 1-53, 3GPP Organizational Partners.

European Patent Office, "Extended European Search Report", Dec. 6, 2013, pp. 1-10.

3rd Generation Partnership Project; Technical Specification Group Radio Access Network; User Equipment (UE) procedures in idle mode and procedures for cell reselection in connected mode (Release 7), 3GPP TS 25.304 v7.0.0, Mar. 2006, pp. 1-38, 3GPP, Sophia Antipolis, France.

* cited by examiner

METHOD AND APPARATUS FOR CONTROLLING MEASURING FREQUENCY OF FORBIDDEN REGISTRATION AREA IN A MOBILE COMMUNICATION SYSTEM

CROSS-REFERENCE OF RELATED APPLICATION

This application claims the benefit under 35 U.S.C. §119 (a) of Korean Patent Applications filed in the Korean Intellectual Property Office on Nov. 10, 2005 and assigned Serial No. 2005-107761, and on Nov. 15, 2005 and assigned Serial No. 2005-109377, the entire disclosures of both of which are hereby incorporated by reference.

BACKGROUND OF THE INVENTION

1. Field of the Invention

The present invention relates generally to a mobile communication system. More particularly, the present invention relates to a method and apparatus for controlling an operation of a User Equipment (UE) when the UE enters into a forbidden registration area and controlling measuring the frequency of the forbidden registration area.

2. Description of the Related Art

A 3rd Generation (3G) mobile communication system operating in Wideband Code Division Multiple Access (WCDMA) based on the European Systems, Global System for Mobile communications (GSM) and General Packet Radio Services (GPRS) in compliance with the 3rd Generation Partnership Project (3GPP) standards, and Universal Mobile Telecommunication System (UMTS) provides a uniform service of sending packetized text, digital audio and video, and multimedia data at high rates of 2 Mbps or above to mobile phone users or computer users irrespective of time and location.

In UMTS, a radio access network called UMTS Terrestrial Radio Access Network (UTRAN) connects UEs to another network over a Core Network (CN) composed of a Circuit Service or Circuit-switched Service (CS) domain and a Packet Service or Packet-switched Service (PS) domain. The entire service area of the UMTS system is divided into a plurality of registration areas such as Location Areas (LAs) and Routing Areas (RAs). An LA is a registration area unit for a CN node in the CS domain, and an RA is a registration area unit for a CN node in the PS domain.

FIG. 1 depicts registration areas in a conventional 3GPP system. Referring to FIG. 1, an LA or RA (LA/RA) may be comprised of cells belonging to a Radio Network Controller (RNC) connected to a CN node. Each LA/RA is handled by one CN node only and a plurality of LAs/RAs may belong to one CN node.

A CN node called Mobile Switching Center (MSC) manages an LA in the CS domain, and a CN node called Serving GPRS Supporting Node (SGSN) manages an RA in the PS domain. When a UE moves to a new LA/RA, the UE registers to the LA/RA by LA Update (LAU)/RA Update (RAU). Then the UE does not need to perform LA/RA registration in case of inter-cell movement within the LA/RA. The LA/RA is defined logically as well as geographically. That is, each registration area can be defined as a geographical area using a predetermined frequency band.

The CN node detects the LA/RA of the UE by the LA/RA registration procedure. If the UE is in idle mode, the CN node pages the UE based on information about the LA/RA of the UE. The idle mode is a mode without a Radio Resource Control (RRC) connection between the UE and the RNC. The idle-mode UE determines whether it is paged by monitoring a Paging Indicator CHannel (PICH), considering an efficient power mode. The paging is a message or a procedure that indicates call incoming for the UE.

Although an LA/RA has a plurality of cells under a particular CN node as illustrated in FIG. 1, this configuration may vary depending on the cell/registration area operating strategy of an operator. While the LA/RA is a registration area unit for the CN node, a UTRAN Registration Area (URA) is a registration area unit for an RNC controlling the radio interface of the UE. The RNC may manage particular UEs on a URA basis.

When the UE moves to a new LA/RA and thus performs LAU/RAU, the CN node of the new LA/RA can reject the LA/RA registration of the UE. For example, if a GSM terminal supporting GSM only enters a UMTS LA/RA, the CN node of the LA/RA can reject the GSM terminal's registration to the LA/RA in order to ensure UMTS service to UMTS terminals.

Nonetheless, the UE conventionally measures the radio strengths of cells within a forbidden registration area for cell reselection, although it is forbidden from registration to the forbidden registration area. As a consequence, the UE dissipates power and cell selection/reselection is rendered inefficient because the UE is forbidden from registering to cells belonging to the forbidden registration area irrespective of the measurement results.

Accordingly, there is a need for an improved method and apparatus for controlling a User Equipment's measuring within a forbidden registration area.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for controlling an appropriate UE operation when a UE enters into a forbidden registration area and controlling measuring the frequencies of LAs/RAs within the forbidden registration area.

According to one aspect of exemplary embodiments of the present invention, in a method of controlling a frequency measurement of a forbidden registration area in a mobile communication system, when a UE enters into a cell within the forbidden registration area, measuring of cells using a first frequency comprising a frequency of the forbidden registration area is limited for a reference time, not considering the cells as candidates for cell reselection. If no suitable cell for a normal service is found before the predetermined time expires, measuring of cells using receivable frequencies including the first frequency are allowed by considering the cells using the receivable frequencies as candidates for cell reselection.

According to another aspect of exemplary embodiments of the present invention, in a UE apparatus for controlling a frequency measurement of a forbidden registration area in a mobile communication system, a forbidden registration area decider determines whether the UE has entered into a cell within the forbidden registration area. A cell measurement controller limits measuring cells using a first frequency comprising a frequency of the forbidden registration area for a reference time, not considering the cells as candidates for cell reselection, when the UE enters into the cell within the forbidden registration area, and allows measuring cells using receivable frequencies including the first frequency, by considering the cells using the receivable frequencies as candidates for cell re-selection, if no suitable cell for a normal service is found before the reference time expires. A cell measurer measures cells using allowed frequencies under the control of the cell measurement controller.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention is intended to control a UE's measuring operation when the UE enters into a forbidden registration area in a mobile communication system.

While the following description is made in the context of a UMTS system operating in asynchronous WCDMA, the subject matter of the present invention, that is the UE's measuring operation in the forbidden registration area is applicable to any mobile communication system having a similar technological background and channel configuration with a slight modification within the scope of the present invention, which is clear to those skilled in the art.

Figure 1:
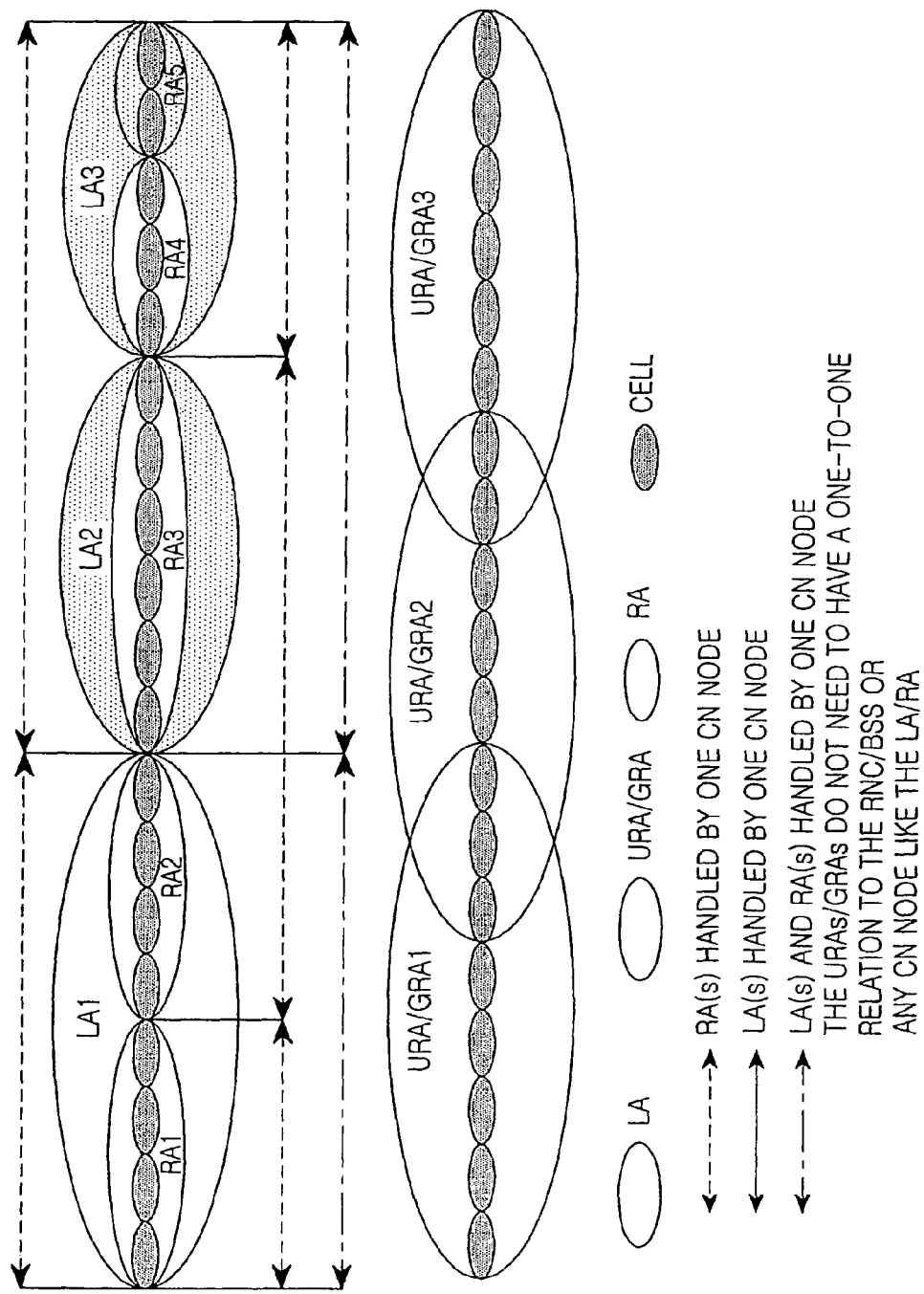
FIG. 1 illustrates registration areas in a conventional 3GPP system.
Figure 2:
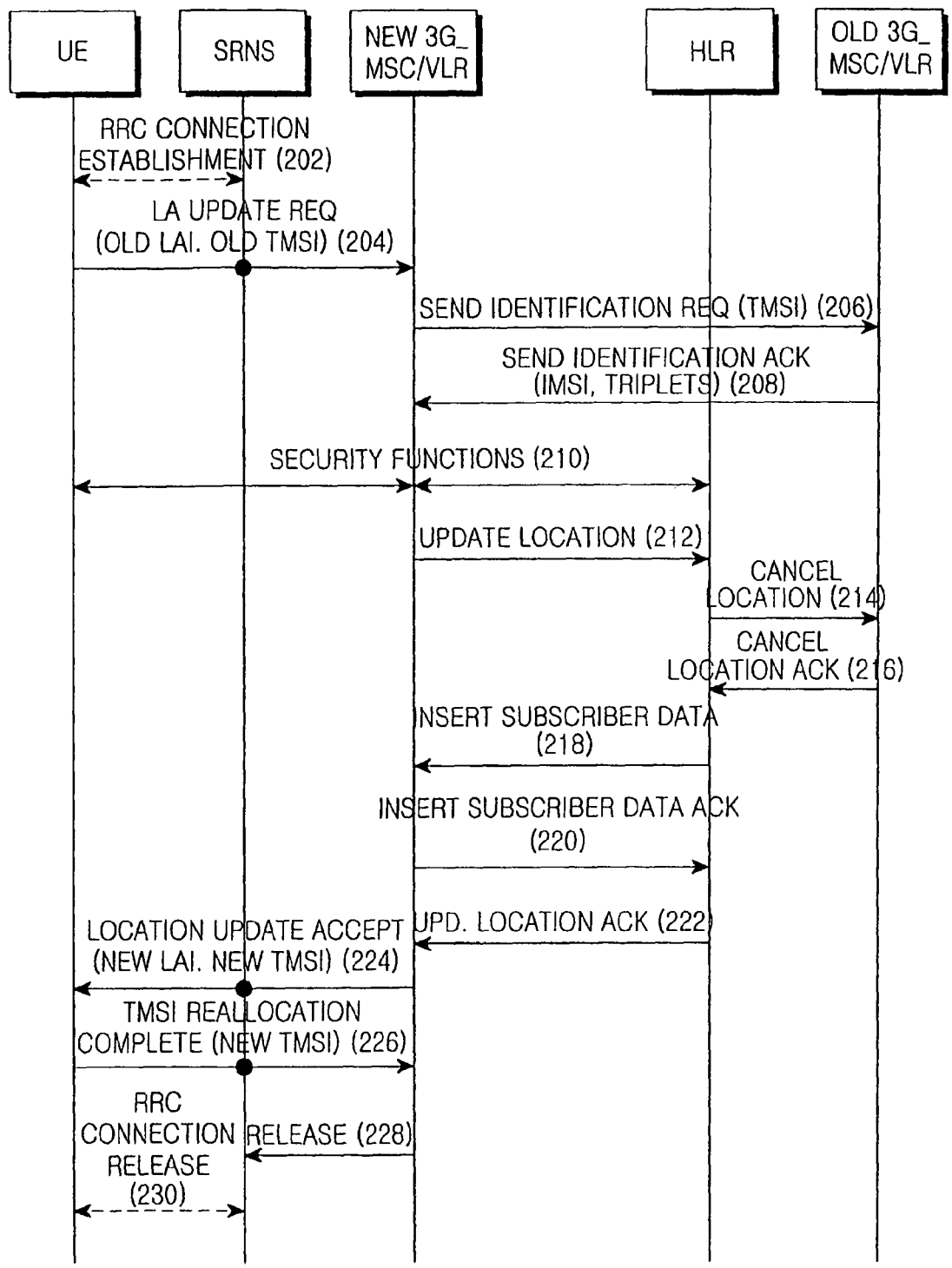
FIG. 2 is a diagram illustrating a signal flow for a conventional LAU/RAU operation.

A description will first be made of a signal flow for an LAU/RAU with reference to FIG. 2. FIG. 2 illustrates an exemplary LAU signal flow when a UE enters into a new LA. In the case where the UE enters into a new RA, the resulting RAU signal flow is almost the same as the LAU signal flow except that an MSC/Visitor Location Register (VLR) is replaced with an SGSN as a CN node in FIG. 2.

Referring to FIG. 2, the UE establishes an RRC connection with a Serving Radio Network Subsystem (SRNS) in step 202 and sends to a new MSC including a VLR (MSC/VLR) managing a new cell an LA UPDATE REQ message containing the old LA Identifier (LAI) and the old Temporary Mobile Station Identifier (TMSI) of an old cell in step 204. In step 206, the new MSC/VLR sends an IDENTIFICATION REQ message including the old TMSI to an old MSC/VLR managing the old cell. The old MSC/VLR replies with an IDENTIFICATION ACK message in step 208.

In step 210, a security procedure is performed among the UE, the new MSC/VLR, and a Home Location Register (HLR). If the UE is authenticated in the security procedure, the new MSC/VLR sends an UPDATE LOCATION message to the HLR in step 212 and the HLR sends a CANCEL LOCATION message to the old MSC/VLR in step 214. In step 216, the old MSC/VLR replies to the HLR with a CANCEL LOCATION ACK message. The HLR sends an INSERT SUBSCRIBER DATA message to the new MSC/HLR in step 218 and the new MSC/VLR replies with an INSERT SUBSCRIBER DATA ACK message in step 220. In step 222, the HLR sends an UPDATE LOCATION ACK message to the new MSC/VLR.

The new MSCNLR sends a LOCATION UPDATE ACCEPT message including a new LAI and a new TMSI to the UE in step 224 and the UE replies with a TMSI REALLOCATION COMPLETE message including the new TMSI in step 226. Then the new MSC/VLR sends a RELEASE message to the SRNS in step 228 and the SRNS releases the RRC connection from the UE in step 230.

The above LAU/RAU is performed to register the UE to a particular LA/RA of a particular CN node. The CN node locates the UE on an LA/RA basis through the LAU/RAU. The LAU/RAU may take place periodically even though the UE has not moved to a new LA/RA as well as when the UE enters into a new LA/RA.

If the current LA of the UE services emergency calls without normal circuit service and normal packet service, the LOCATION AREA ACCEPT message is replaced by a LOCATION AREA REJECT (LAR) message in step 224. The LAR message indicates that the CN node has rejected the UE's registration to the new LA for normal service.

With the LA/RA registration rejection, the UE cannot receive the normal service in the LA/RA and thus has to move to another LA/RA for the normal service. If the UE fails to detect a suitable cell for the normal service in the new LA/RA due to radio strength or cell access restriction, the UE can receive limited service like emergency calls in the LA/RA forbidden from the normal service (hereinafter, referred to forbidden LA/RA). The cell that allows the limited service is called an acceptable cell. The normal service refers to services other than predefined limited services.

When the LA/RA registration is rejected, that is, the UE is in a cell within the forbidden LA/RA, the UE operates in the following fashion.

An operation for controlling an efficient frequency measurement for the forbidden LA/RA according to an exemplary embodiment of the present invention will be described below.

Figure 3:
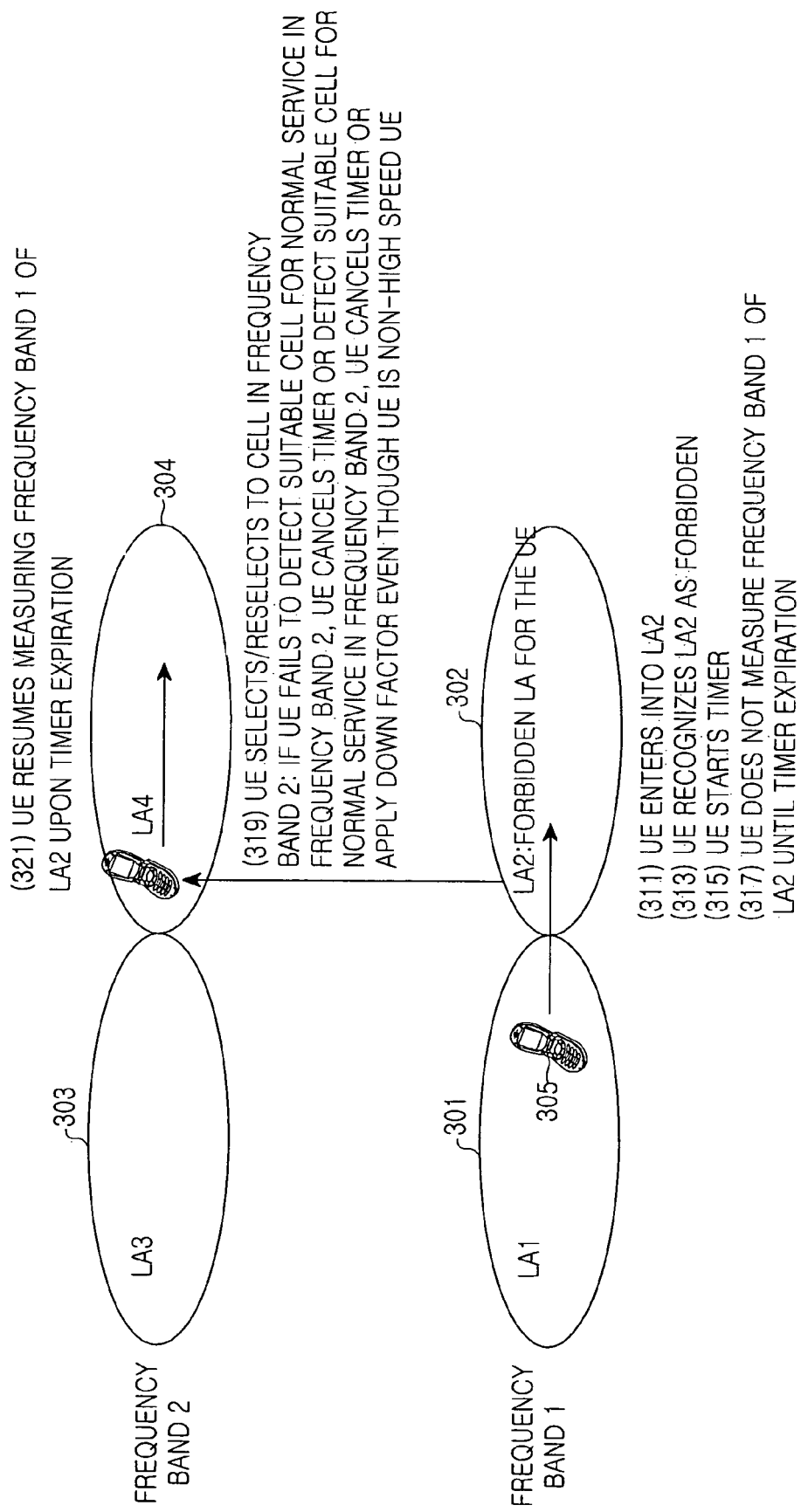
FIG. 3 illustrates an operation for measuring the frequency band of a forbidden registration area in a UE according to an exemplary embodiment of the present invention.

FIG. 3 illustrates an operation for controlling a UE measuring the frequency band of a forbidden LA/RA according to an exemplary embodiment of the present invention. While the following description is made of an LA, the same applies to an RA.

Referring to FIG. 3, reference numerals 301 and 302 denote a first LA (LA 1) and a second LA (LA 2) that use a first frequency band (frequency band 1 or frequency 1). Reference numerals 303 and 304 denote a third LA (LA 3) and a fourth LA (LA 4) that use a second frequency band (frequency band 2 or frequency 2 ). Reference numeral 305 denotes a UE roaming on frequency 1. As the UE 305 moves to LA2, it performs LAU for LA2.

LA2 is forbidden to the UE 305, the UE 305 receives an LAR message during the LAU, thus recognizing the forbidden LA2. Aside from the LAR message, the UE 305 can be aware that LA2 is forbidden in any other way. For example, if the UE 305 acquires the LAI of LA2 by system information from a new cell within LA2 and the LAI is present in a stored forbidden LA list, the UE 305 determines that LA2 is forbidden before the LAU.

Once the UE 305 is aware that LA2 is forbidden, it considers cells using any other frequency band than frequency band 1 as candidates for cell selection/reselection, excluding the cells of frequency band 1 which LA2 uses. This serves the purpose of continuously preventing LAU for LA2 forbidden to the UE 305. The UE 305, for example, searches for a suitable cell for cell selection/reselection by measuring the signal strengths of the cells of at least one frequency other than frequency band 1, for example, the cell of frequency band 2, without measuring the signal strengths of the cells using frequency band 1 within LA2.

The UE 305 activates a timer when it recognizes that the destination LA2 is forbidden, that is, when the UE 305 interprets the LAR message or determines that the LAI acquired by system information from a destination cell is present in the forbidden LA list. However, when the UE 305 starts to move frequency band 2, the UE activates the timer. The timer counts the time for which measuring the radio strengths of the cells in frequency band 1 is forbidden, for example, 300 seconds.

Thus, the UE 305 does not measure frequency band 1 used for LA2 until the time expires, thereby preventing unwanted measurements. During the time that the timer counts, the UE 305 probability for staying in LA2 in frequency band 1 is highly probably. In this case, the UE 305 cannot move to another cell in frequency band 1 irrespective of the measurement results of the cells using frequency band 1. When the timer expires or stops, the UE 305 resumes measuring the cells of frequency band 1.

The timer is used to avoid measuring a specific frequency band as described above. In an exemplary implementation, the timer is used to prevent measuring a specific cell. That is, when the UE moves to the specific cell and recognizes that the cell is forbidden, the UE does not measure the cell until the timer expires. A description for using the timer to avoid measuring a specific frequency band will be described below.

The timer is set to a predetermined value implicitly or a value notified by a network by explicit signaling on a common channel or a dedicated channel. The common channel is a Broadcast Control CHannel (BCCH) or a Forward Access CHannel (FACH) that any UE can receive. The dedicated channel is a channel dedicated to one UE.

The timer can be set adaptively according to the velocity of the UE. In an exemplary embodiment of the present invention, the timer value is optimized according to the UE's velocity. For example, if the UE does not move fast, that is, the UE moves at a velocity equal to or lower than a threshold, a first timer value (timer 1) is used. If the UE moves fast, a second timer value (timer 2) is used. In an exemplary implementation, if the UE does not move fast, timer 1 is used which is a default value. If the UE move fast, timer 2 which is less than timer 1 is set by applying a down factor to timer 1. Time 2 can be used in avoiding measuring the frequency band of a forbidden LA.

The down factor is a predetermined fixed value or signaled on a common channel or a dedicated channel. If a signaled down factor is 0.2, timer 2 is calculated by multiplying timer 1 by the down factor. Many formulas are available in applying the down factor to timer 1 and the exemplary embodiments of the present invention do not limit the formulas except that timer 2 is shorter than timer 1 set for application to a fast-moving UE.

The down factor is signaled for the above-described purpose or derived from am existing factor serving any other usage. For example, the 3GPP system uses a predetermined down factor to a reselection timer $T_{reselection}$ in order to prevent the ping-pong phenomenon of cell selection when the UE moves fast. This down factor can be applied to timer 1 to limit measurement in an exemplary embodiment of the present invention. When the UE selects the same cells repeated due to an instantaneous unstable radio state for a short time, this is called ping-pong. $T_{reselection}$ is set to prevent this ping-pong and the UE reselects to a destination cell when the destination cell is kept at a higher radio strength than a current cell for at least $T_{reselection}$.

Table 1 below illustrates the format of down factor information applied to $T_{reselection}$ for a fast UE, included in system information broadcast within a cell in the 3GPP system. The down factor information may reside in System Information Block (SIB) 3/4.

TABLE 1

| Information Element/Group | Need | Multi | Type and reference | Semantics description |
|---|---|---|---|---|
| Speed dependent scaling factor for $T_{reselection}$ (down factor information) | OP | | Real (0 . . . 1 by step of 0.1) | This IE is used by the UE in high mobility state as scaling factor for $T_{reselections}$ or $T_{reselections,\ PCH}$ or $T_{reselections,\ FACH}$ |

Besides the velocity of the UE, another timer can be used in a particular scenario in an exemplary embodiment of the present invention.

For example, if the UE moves to a frequency band other than the frequency band of the forbidden LA/RA and cannot find a suitable cell for normal service, timer 2 is used to limit measuring the frequency band of the forbidden LA/RA or timer 1 used for limiting the measuring is updated to a smaller value. Since emergency calls are available to the UE in the forbidden LA/RA, the UE has to search for a suitable cell for the normal service as soon as possible and move to the suitable cell. Therefore, the UE monitors all receivable frequency bands including the frequency band of the forbidden LA/RA using timer 2.

The use of timer 2 is indicated according to an implicit rule or by explicit signaling. In the latter case, the use of timer 2 is indicated by a common channel or a dedicated channel. Alternatively, the UE may use no timers. That is, the UE continuously measures all frequency bands including the frequency band of the forbidden LA/RA.

Timer 1, timer 2 for use in a fast UE, a down factor with which to generate timer 2 shorter than timer 1, and the use of the down factor in generating timer 2 in a specific case have been described above. If timer 1 or timer 2 expires, the UE resumes measuring all frequency bands including the frequency band of the forbidden LA/RA. If a destination LA/RA is forbidden again, timer 1 or timer 2 is applied according to the afore-described rule and measuring the frequency band of the forbidden LA/RA is limited while the timer runs.

Referring to FIG. 3, the UE moves to LA2 using frequency band 1 in step 311 and recognizes LA2 as forbidden in step 313. The UE is aware that LA2 is a forbidden one by an LAR message received from the network or detecting the LA1 of LA2 acquired by system information in the stored forbidden LA list.

In step 315, the UE starts a timer. If the UE moves fast, it may generate timer 2 shorter than timer 1 by applying a down factor acquired by SIB 3/4 to timer 1 set to a predetermined value and activate timer 2. While the down factor received in SIB 3/4 is used in the illustrated case of FIG. 3, a new down factor may be applied to timer 1 as stated before. If the UE does not move fast, timer 1 is used.

In step 317, since the UE excludes the cells using frequency band 1 of LA2 from candidates for cell selection/reselection until timer 1 or timer 2 activated according to the velocity of the UE expires, it does not measure the cells of frequency band 1. In other words, the UE measures the cells of the other frequency bands, that is, the cells using frequency band 2. Upon detection of a suitable cell for the normal service among the cells of frequency band 2, the UE camps on the suitable cell in frequency band 2 by cell selection/reselection in step 319.

If the UE fails to find a suitable cell in frequency band 2, the UE cancels the timer and measures all frequency bands including frequency band 1, that is, frequency band 1 and frequency band 2 and attempts to detect an acceptable cell that can provide at least emergency calls. In an exemplary implementation, if the UE fails to detect a suitable cell, the UE updates the on-going timer 1 to timer 2 using a pre-received down factor so that the measuring limitation of frequency band 2 is eliminated earlier. If timer 1 or timer 2 expires, the UE resumes measuring frequency band 1 that LA2 uses, thus measuring all frequency bands in step 321.

Figure 4:
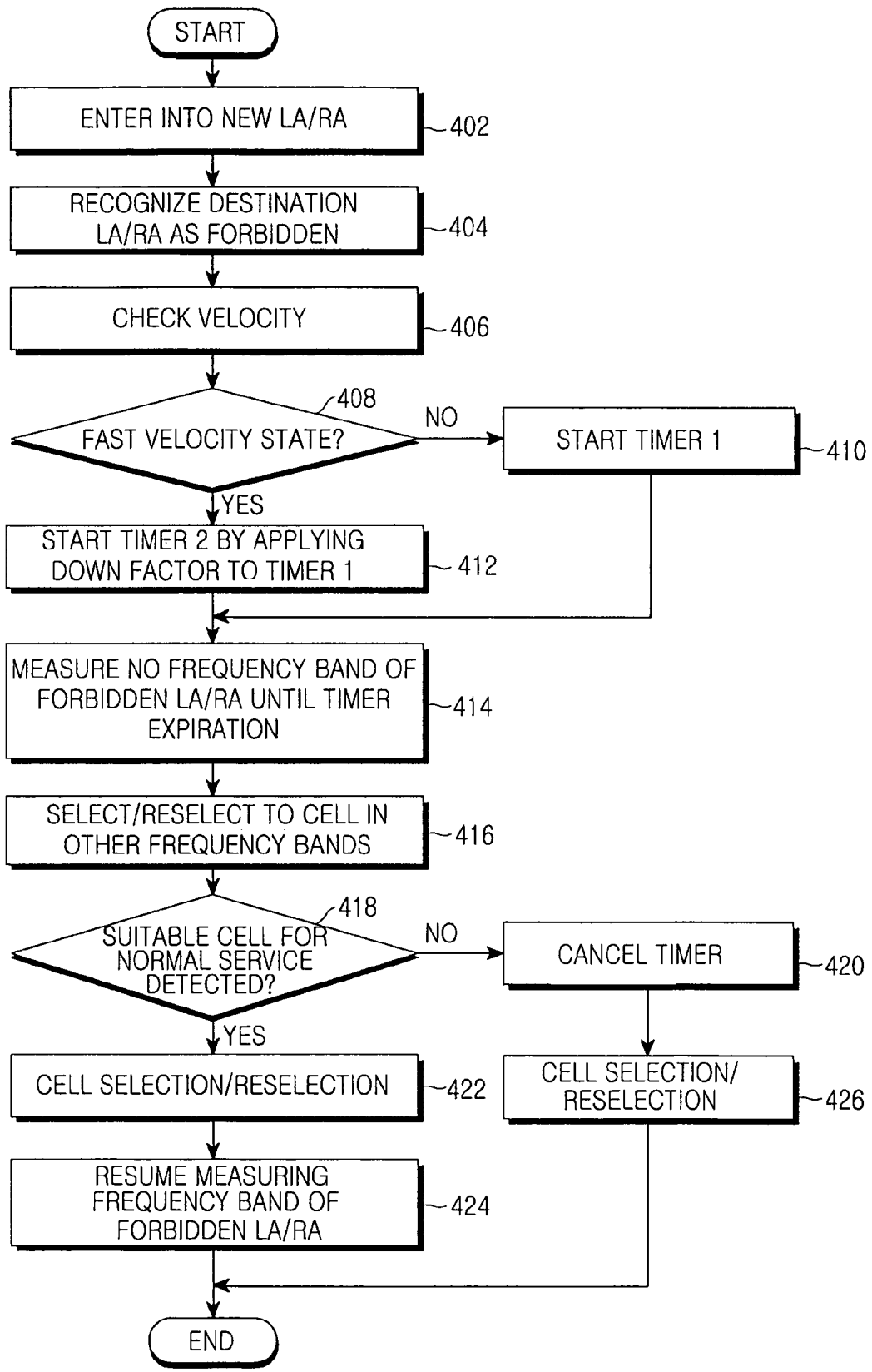
FIG. 4 is a flowchart illustrating a UE operation according to an exemplary embodiment of the present invention.

FIG. 4 is a flowchart illustrating a UE operation according to an exemplary embodiment of the present invention. While the following description is made of the case of using different timers depending on the velocity of the UE, it is to be clearly understood that a single timer can be used irrespective of the velocity of the UE.

Referring to FIG. 4, the UE enters a cell within a new LA/RA in step 402. For example, the UE ranks measured cells in a descending order and recognizes that the highest ranked cell is in a different LA/RA from that of an old cell that the UE camped on. In step 404, the UE is aware that the new LA/RA is forbidden by an LAR message received from the network or an LA1 broadcast in the cell during an LAU/RAU in the new LA/RA. If a timer is used irrespective of the velocity of the UE, the UE proceeds to step 410. On the other hand, if a different timer is used according to the velocity of the UE, steps 406, 408 and 412 are performed.

In step 406, the UE checks its current velocity state. The velocity state can be detected in many ways. One way is that the UE determines whether it is moving fast by counting cells changed for a predetermined period of time in the 3GPP system. If the count exceeds (or is equal to or larger than) a predetermined threshold, the UE recognizes itself as moving fast. In another case, a speedometer provided to the UE can be used. The velocity state can be checked in any method.

In step 408, the UE determines whether it is moving fast. In the case of a high velocity state, the UE creates timer 2 shorter than timer 1 being a predetermined value (for example, 300 seconds) using a predetermined or signaled down factor and then starts timer 2 in step 412. If the UE is not moving fast, timer 1 is started in step 410. The UE does no measure of cells using the frequency band of the forbidden LA/RA because the UE excludes the cells of the forbidden LA/RA from candidates for cell selection/reselection until timer 1 or timer 2 expires in step 414.

In step 416, the UE measures the cells of at least one frequency band other than that of the forbidden LA/RA, considering the cells to be candidates for cell selection/reselection. The UE determines whether a suitable cell exists in the at least other frequency band for the normal service in step 418. In the presence of the suitable cell, the UE camps on the suitable cell by cell selection/reselection in step 422.

When the timer expires after the camping, the UE measures the cells using the frequency band of the forbidden LA/RA, considering the cells to be candidates for cell selection/reselection in step 424.

On the other hand, if the UE fails to detect a suitable cell in step 418, the UE cancels the timer and measures cells of all frequency bands, considering even the cells using the frequency band of the forbidden LA/RA to be candidates for cell selection/reselection in step 420. In step 426, the UE detects an acceptable cell in which emergency calls are available in the frequency band of the forbidden LA/RA or a suitable cell in another frequency band, and performs cell selection/reselection on the detected cell.

While not shown, it can be further contemplated as an exemplary embodiment of the present invention that the UE updates timer 1 to timer 2 shorter than timer 1 using the above described down factor rather than canceling timer 1 in step 420 to limit measuring the frequency band of the forbidden LA/RA until timer 2 expires. In an exemplary implementation, the UE updates timer 1 to a shorter value by applying a new down factor to timer 1 or starts a predetermined shorter timer, and limits measuring the frequency band of the forbidden LA/RA until the timer expires. In this case, the UE starts timer 2 or a new shorter timer, or updates the on-going timer 1 to a shorter value. If timer 2 is running in step 420, the UE cancels timer 2 or maintains timer 2 without update, or updates timer 2 to a shorter value.

While not shown, if the velocity state of the UE changes before the timer expires in step 412, 410 or 420, or if cell selection/reselection to the suitable cell for the normal service in another frequency band is impossible, the timer is updated or canceled.

Figure 5:
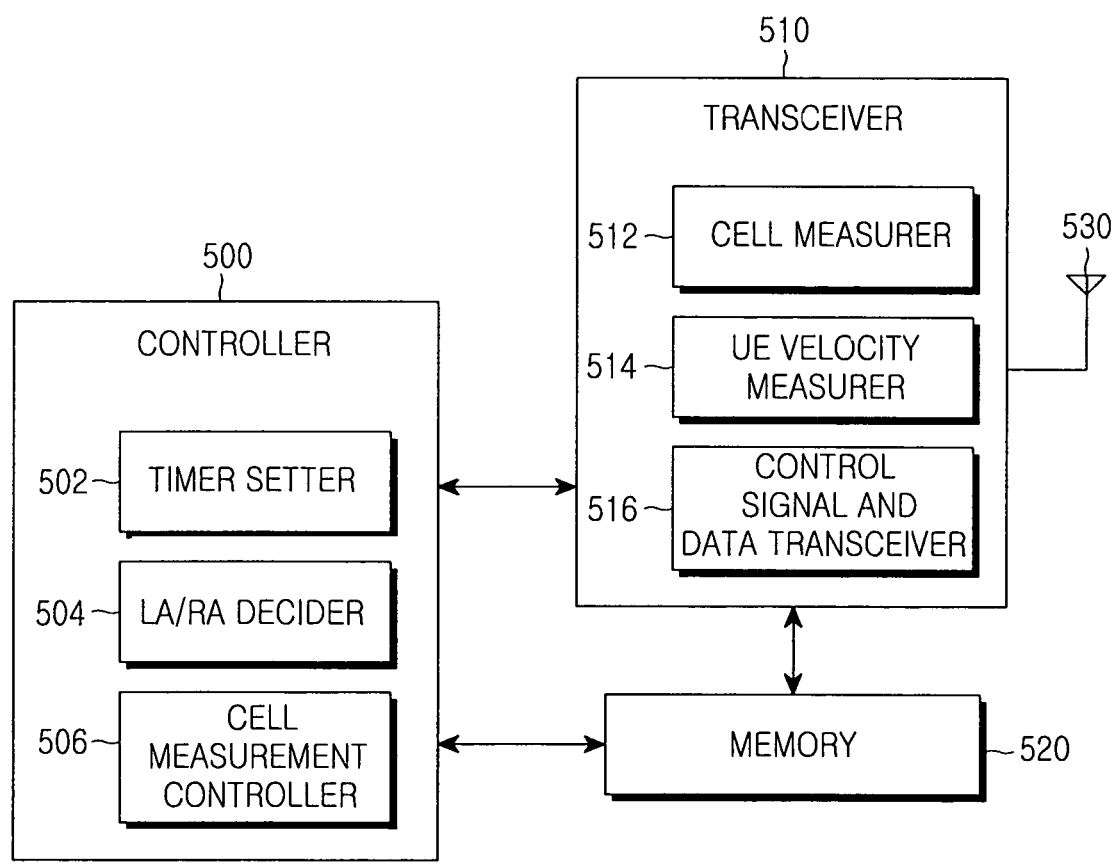
FIG. 5 is a block diagram of the UE according to an exemplary embodiment of the present invention.

FIG. 5 is a block diagram of the UE according to an exemplary embodiment of the present invention. Referring to FIG. 5, a controller 500 includes a timer setter 502, an LA/RA decider 504, and a cell measurement controller 506. A transceiver 510 includes a cell measurer 512, a UE velocity measurer 514, and a control signal and data transceiver 516. These blocks are logical software function blocks or physical hardware blocks.

In operation, if the velocity measurement of the UE velocity measurer 514 indicates that the UE is in a high velocity state, the timer setter 502 sets a timer suitable for the high velocity state by applying a predetermined down factor 1 to a predetermined default timer. If the UE is not in the high velocity state, the timer setter 502 sets a timer suitable for the non-high velocity state by applying a predetermined down factor 2 to the default timer. The following description is made with the appreciation that the default timer is still used for the non-high velocity state, rather than down factor 2 is applied. The default timer is called timer 1 and the timer scaled by down factor 1 for the high velocity state is called timer 2.

The LA/RA decider 504 determines whether the UE is in a forbidden LA/RA based on a control signal from the cell measurer 512 and a control signal and associated information from the control signal and data transceiver 516. For example, the LA/RA decider 504 makes the determination information (a forbidden LA/RA list and LAIs) about forbidden cells within forbidden Las/RAs included in the control signal received from the control signal and data transceiver 516 and the rankings of cell measurements received from the cell measurer 512. In another case, the LA/RA decider 504 makes the determination by checking whether an LAR message has been received from the control signal and data transceiver 516. A memory 520 stores the timer value set by the timer setter 502 and control signals and data received from or to be provided to the control signal and data transceiver 516.

If the LA/RA decider 504 determines that the UE is in a forbidden LA/RA, the cell measurement controller 506 starts the timer read from the memory 520 and controls the cell measurer 512 to limit measuring cells using the frequency band of the forbidden LA/RA. The cell measurement controller 506 operates as described in FIG. 4.

Figure 6:
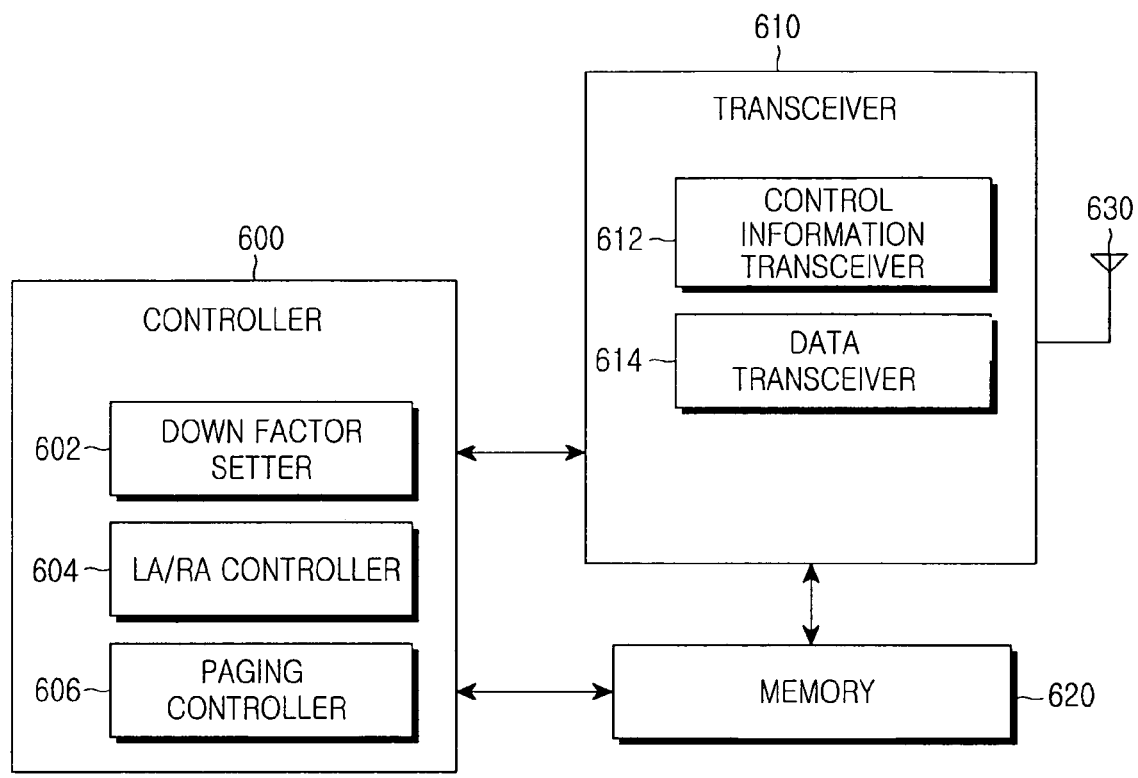
FIG. 6 is a block diagram of a network according to an exemplary embodiment of the present invention.

FIG. 6 is a block diagram of a network apparatus according to an exemplary embodiment of the present invention. The network apparatus covers a Node B, an RNC and a CN node. A part for transmitting and receiving data to and from a UE through an antenna 630 corresponds to the Node B. Referring to FIG. 6, a controller 600 includes a down factor setter 602, an LA/RA controller 604, and a paging controller 606. A transceiver 610 includes a control information transceiver 612 and a data transceiver 614. These blocks can be logical software function blocks or physical hardware blocks.

Referring to FIG. 6, the down factor setter 602 sets a down factor for a fast UE and signals the down factor to the UE through the control information transceiver 612. The down factor may be read from a memory 620. When needed, the down factor setter 602 may further set and signal another down factor for a slow UE.

The LA/RA controller 604 acknowledges the LAU/RAU of the UE in response to an LAU/RAU REQ message received from the UE through the control signal transceiver 612. The data transceiver 614 is responsible for sending and receiving actual data to and from the UE. The memory 620 stores control signals and data for the UE, and registration information of the UE.

Figure 7:
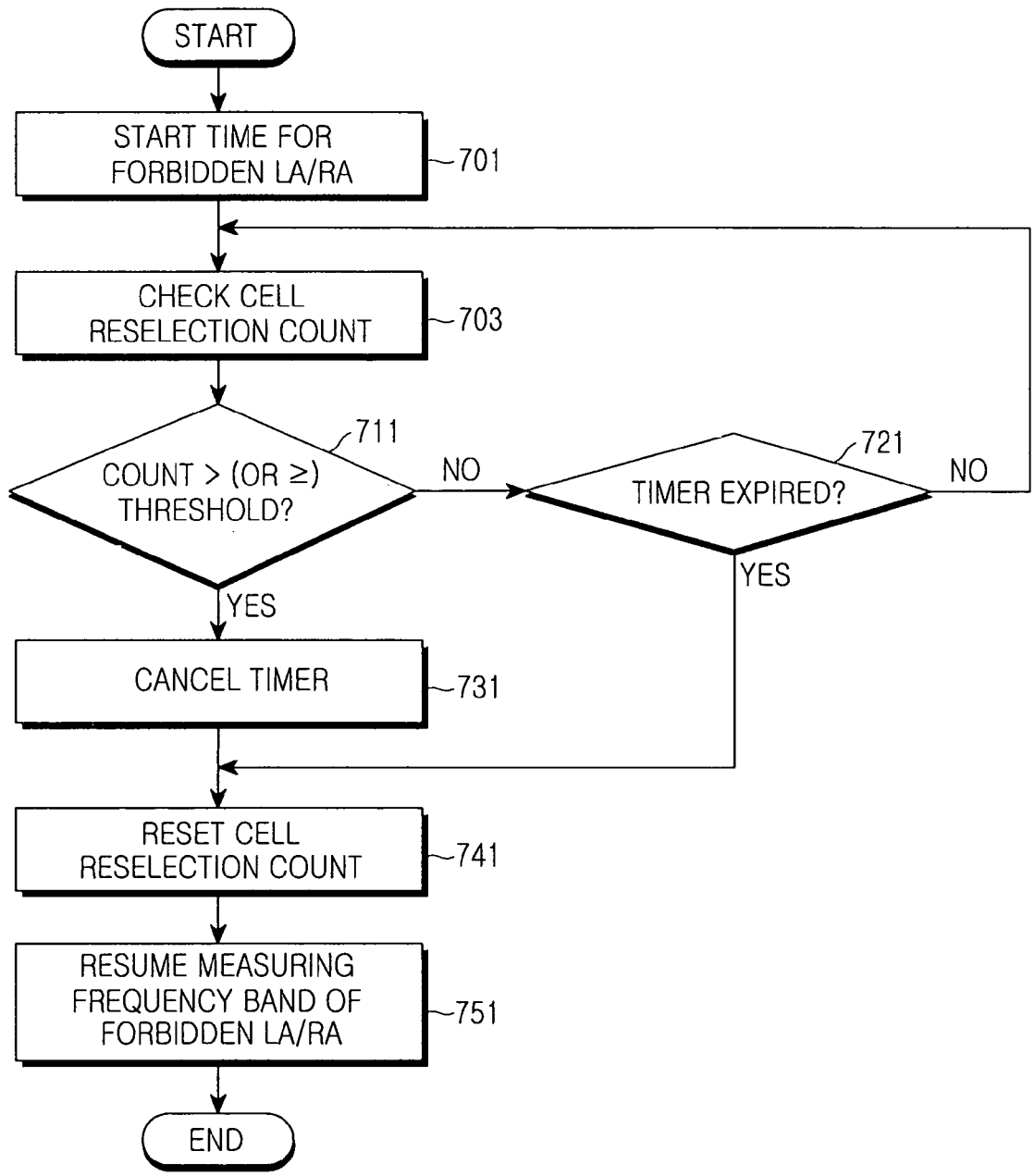
FIG. 7 is a flowchart illustrating a UE operation according to an exemplary embodiment of the present invention.

FIG. 7 is a flowchart illustrating a UE operation according to an exemplary embodiment of the present invention. The following steps may be performed in addition to the steps of FIG. 4. Referring to FIG. 7, the UE enters into a forbidden LA/RA and starts a timer for limiting frequency measuring in step 701. As performed in step 410 or 412 of FIG. 4, a different timer value may be used according to the velocity of the UE. The timer functions to limit measuring radio strengths of the frequency band of the forbidden LA/RA in step 701. While the timer runs, the UE measures cells using frequency bands other than the cells of the forbidden LA/RA.

In step 703, the UE counts the number of cell reselections after the timer starts. The counting continues until the time expires or is cancelled. The number of all reselected cells is counted or the number of cells reselected repeatedly is subtracted from the count. For example, when the UE moves to cell 1, cell 2, cell 1, cell 2, cell 3, cell 4, cell 3 and cell 5 in this order, the reselection count is 8 in the former method and 5 in the latter method.

While the latter counting method requires information about cells selected until the timer expiration or cancellation, for example, UpLink UTRA Absolute Radio Frequency Channel Numbers (UL UARFCNs) indicating frequencies and scrambling codes used for Primary Common Pilot Channels (P-CPICHs) of the cells, the counting method prevents incorrect counting caused by frequent movement-incurred ping-pong. Ping-pong is the phenomenon that same neighbor cells are repeatedly reselected due to unstable radio strengths even though the UE does not move much geographically. If the former counting method is adopted with no regard to ping-pong, a higher cell reselection count may lead to a high probability that the UE is out of the forbidden LA/RA, despite the fact that the UE has not moved much geographically.

In the former counting method, the cell reselection count is increased by 1 each time a cell is reselected until the timer expires or is cancelled in step 703. In the latter counting method, the UE has to store and update information about a cell (frequency information and a P-CPICH scrambling code) each time it reselects the cell and increases the count by 1 when the information of the cell is not present in the stored cell information. P-CPICH scrambling codes can be used to identify cells.

In step 711, the UE compares the count with a predetermined threshold before the timer expiration or timer cancellation. The threshold is implicitly set or explicitly signaled. In case of explicit signaling, the threshold is delivered on a common channel or a dedicated channel, like system information. If the threshold is implicitly set, the UE internally has information about the threshold by hard coding.

If the count exceeds (or is equal to or higher than) the threshold in step 711, the UE cancels the timer in step 731 and resets the cell reselection count to 0 and clears the stored cell information in step 741. In step 751, the UE resumes measuring the frequency band of the forbidden LA/RA.

If the count is equal to or less than the threshold (or below the threshold) in step 711, the UE checks timer expiration in step 721. Upon timer expiration, the UE resets the cell reselection count to 0 and clears the stored cell information in step 741 and resumes measuring the frequency band of the forbidden LA/RA in step 751. If the timer continues in step 721, the UE returns to step 703 to continue counting cell reselections.

As described above, the exemplary embodiments of the present invention prevents an unnecessary measuring operation for cell selection/reselection in a forbidden LA/RA which does not provide normal service to a UE. Therefore, power consumption of the UE is minimized and the efficiency of cell reselection is improved.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of controlling a frequency measurement of a forbidden registration area in a mobile communication system, the method comprising: measuring a first frequency in a first frequency band of a first period for cell reselection; when a User Equipment (UE) recognizes that a cell on the first frequency in the first frequency band is in a forbidden registration area based on a received location area reject (LAR) message, starting a timer having a reference time, measuring at least one second frequency in a second frequency band different from the first frequency band for the reference time for cell reselection, and suspending measurement of the first frequency used in the cell and other cells by not considering the cell and other cells as candidates of cell reselection for the reference time; and when UE detects that no suitable cell for a normal service is found based on the measurement for the at least one second frequency, canceling the timer before the reference time expires and measuring receivable frequencies including the first frequency, wherein the cell recognized as being in the forbidden registration area and the other cells on the first frequency are considered as candidates for cell reselection.

2. The method of claim 1, further comprising searching for an acceptable cell for a limited service by measuring the cell using the receivable frequencies.

3. The method of claim 1, further comprising measuring the at least one cell using receivable frequencies including the first frequency, by considering the cell and the other cells on the first frequency as candidates for cell reselection, when the reference time expires.

4. The method of claim 1, further comprising measuring the at least one cell using receivable frequencies including the first frequency, by considering the cell and the other cells on the first frequency as candidates for cell reselection, when a count of the cell reselections of the UE exceeds a threshold before the reference time expires.

5. The method of claim 1, further comprising updating the reference time to a shorter time period if no suitable cell for the normal service is found before the reference time expires.

6. An apparatus for controlling a frequency measurement of a forbidden registration area of a User Equipment (UE) in a mobile communication system, the apparatus comprising: a receiver configured to receive location area reject (LAR) message; and a controller configured to: measure a first frequency in a first frequency band for a first period for cell reselection; when a cell on the first frequency in the first frequency band is in a forbidden registration area based on the received LAR message, start a timer having a reference time, measure at least one second frequency in a second frequency band different from the first frequency band for the reference time for cell reselection and suspend the measurement of the first frequency used in the cell and other cells by not considering the cell and other cells as candidates for cell reselection for the reference time, and when a suitable cell for a normal service is not found based on the measurement for the at least one second frequency, cancel the timer before the reference time expires and measure receivable frequencies including the first frequency wherein the cell recognized as being in the forbidden registration area and the other cells on the first frequency are considered as candidates for cell reselection.

7. The apparatus of claim 6, wherein the controller is further configured to search for an acceptable cell for a limited service according to result of measuring the cell using receivable frequencies.

8. The apparatus of claim 6, wherein the controller is further configured to measure the at least one cell using receivable frequencies including the first frequency, by considering the cell and the other cells on the firs frequency as candidates for cell reselection, when the reference time expires.

9. The apparatus of claim 6, wherein the controller is further configured to measure the at least one cell using receivable frequencies including the first frequency, by considering the cell and the other cells on the first frequency as candidates for cell reselection, when a count of cell reselections of the UE exceeds a threshold before the reference time expires.

10. The apparatus of claim 6, wherein the controller is further configured to update the reference time to a shorter time period if no suitable cell for the normal service is found before the reference time expires.

11. A non-transitory computer-readable recording medium storing a computer program code for performing a method of a controlling a frequency measurement for a forbidden registration area in a mobile communication system, the code comprising executable instructions for: measuring a first frequency in a first frequency band for a first period for cell reselection; when a User Equipment (UE) recognizes that a cell on the first frequency in the first frequency band is in a forbidden registration area based on a received location area reject (LAR) message, starting a timer having a reference time, measuring at least one second frequency in a second frequency band different from the first frequency band for the reference time for cell reselection, and suspending measurement of the first frequency used in the cell and other cells by not considering the cell and other cells as candidates for cell resection for the reference time; and when the UE detects that no suitable cell for a normal service is found based on the measurement for the at least one second frequency, canceling the timer before the reference time expires and measuring receivable frequencies including the first frequency, wherein the cell recognized as being in the forbidden registration area and the other cells on the first frequency are considered as candidates for cell reselection.

12. The non-transitory computer-readable recording medium of claim 11, further comprising executable instructions for searching for an acceptable cell for a limited service by measuring the cell using receivable frequencies.

13. The non-transitory computer-readable recording medium of claim 11, further comprising executable instructions for measuring the at least one cell using the receivable frequencies including the first frequency, by considering the cell and the other cells on the first frequency as candidates of cell reselections, when the reference time expires.

14. The non-transitory computer-readable recording medium of claim 11, further comprising executable instructions for measuring the at least one cell using receivable frequencies including the first frequency, by considering the cell and the other cells on the first frequency as candidates for cell reselection, when a count of cell reselections of the UE exceeds a threshold before the reference time expires.

15. The non-transitory computer-readable recording medium of the claim 11, further comprising executable instructions for updating the reference time to a shorter time period if no suitable cell for the normal service is found before the reference time expires.

16. The method of claim 1, wherein the reference time is 300 seconds.

17. The method of claim 6, wherein the reference is 300 seconds.

18. The non-transitory computer-readable recording medium of claim 11, wherein the reference time is 300 seconds.

* * * * *